United States Patent [19]

Atencio

[11] 4,170,428
[45] Oct. 9, 1979

[54] DAM WITH SUSPENDED HYDROELECTRIC STATION

[76] Inventor: Francisco J. G. Atencio, 3105 Diamante, Entre Rios, Argentina

[21] Appl. No.: 814,549

[22] Filed: Jul. 11, 1977

[51] Int. Cl.² ............................................. E02B 9/00
[52] U.S. Cl. ........................................ 405/78; 290/53
[58] Field of Search ............... 61/19, 20, 69 R, 69 A, 61/43, 86; 290/53, 52; 415/181; 417/234, 100; 416/85

[56] References Cited

U.S. PATENT DOCUMENTS

| | | | |
|---|---|---|---|
| 840,042 | 1/1907 | Church | 61/19 |
| 1,002,241 | 9/1911 | Eells | 61/19 |
| 1,042,381 | 10/1912 | Baker | 61/19 |
| 1,487,391 | 3/1924 | Kochlin | 61/19 |
| 1,704,417 | 3/1929 | Zoll | 415/181 |
| 2,764,871 | 10/1956 | Dowling | 61/19 |
| 2,783,392 | 2/1957 | Corbiere | 290/52 |
| 4,078,388 | 3/1978 | Atencio | 405/77 X |

FOREIGN PATENT DOCUMENTS

518877  6/1921  France ........................................ 61/19

OTHER PUBLICATIONS

Engineering News-Record, Nov. 16, 1950, pp. 35 & 36.

Primary Examiner—Dennis L. Taylor
Attorney, Agent, or Firm—Emory L. Groff, Jr.

[57] ABSTRACT

A water storing dam body with means for directing a water flow therethrough includes one or more hydromotive assemblies suspended adjacent said dam water directing means. Each hydromotive assembly comprises a unitary assembly including an energy generation unit associated with a machine hall and buoyancy means regulatable to suspend the hydromotive assembly in operative position without imposing stresses upon the structural body of the dam due to its weight. Disposed downstream of the dam body, adjacent each water directing means, is a diffuser which is either fully or partly embodied as an integral portion of the dam body.

8 Claims, 4 Drawing Figures

DAM WITH SUSPENDED HYDROELECTRIC STATION

The present invention relates generally to dams having hydroelectric stations erected in river watersheds for the purpose of energy generation-transformation, navigation development, flood control and the provision of good water storage for flood control. By energy generation-transformation, it is intended to include the increasingly popular reversible pumped-storage electric power systems.

The hydromotive assembly according to the present arrangement is intended to be positioned adjacent the water directing means or water passages disposed through the main body of a dam so as to employ the inherent gravitational energy stored in the mass of water behind the dam, for the conversion thereof into electric energy. Alternatively, this inherent gravitational energy can be increased by using excess electric energy from other generation sources to operate the hydromotive assembly in a reverse mode, thus transforming this excess energy into volumes of water pumped and stored behind the dam.

With the instant engineered construction methodology a substantially increased efficiency is obtained not only in the initial construction of the hydromotive assembly and the attendant dam body, but also in the erection of the assembly and in its operation. First, the construction time for the dam body and hydromotive assembly are substantially reduced along with a noteworthy reduction in the amount of material required. With the present construction, a dam body of considerably less mass is required due to the suspended feature of the associated hydromotive assembly and the introduction of the substantially horizontal-axis engineered concept. By suspending the hydromotive assembly in its operative position it will be appreciated that a far lesser amount of concrete construction will be required in the dam body, which construction is further lessened due to the avoiding of the incorporation of machine halls for the hydromotive assembly as an integral part thereof. The hydromotive assembly itself will be understood preferably to be an integral assembly including a capsule-mounted energy generation or transformation unit having a turbine of the Kaplan type with its longitudinal axis horizontally disposed. With such construction in mind, it will be appreciated that the more intricate manufacture involving the hydromotive assembly takes place at a remote factory location with the desirable result that the completed hydromotive assembly may be subsequently readily transported to a dam site and, by means of incorporated bouyancy chambers, controllably submerged and positioned adjacent the dam water passage, either upstream or downstream thereof. A further reduction in construction cost may be realized by incorporating a diffuser downstream of each dam body water passage, as an integral part of the dam body, either fully or partly embodied therewith.

A difficulty encountered during the operation of generator sets is the well known runaway condition. A runaway condition imposes extreme stresses upon not only the components of an electric generation set but also upon the surrounding construction of the structural body of the dam. Several well known means are usually provided, including hydraulic systems for closure of the distributor movable gate vanes and/or means for closure of upstream and downstream gates to halt water flow through the conduit surrounding the hydroelectric set. Experience has clearly shown that certain of these protective measures often fail or at least, require a lengthy period of time to operate. In any case, dangerous stresses are transmitted to the components of the hydroelectric set and the surrounding structural body of the dam. With the construction of the present hydromotive assembly a suspended arrangement is provided which greatly relieves all such stresses and additionally allows of employment of the reaction during a runaway condition to axially displace the hydromotive assembly away from its associated dam body water passage.

Accordingly, one of the objects of the present invention is to provide an improved dam with suspended hydroelectric stations including an integral hydromotive assembly having a horizontal-axis energy transformation unit.

A further object of the present invention is to provide an improved dam with suspended hydroelectric station including a dam body of substantially reduced mass and incorporating a hydromotive assembly including integral buoyancy means for maintaining same in a suspended operable position.

Another object of the present invention is to provide an improved dam with suspended hydroelectric station including an integral hydromotive assembly having buoyancy means for maintaining one end thereof adjacent fluid conveying means through the dam body, which means communicates in turn with a diffuser integrally formed with the dam body.

Still another object of the present invention is to provide an improved dam with suspended hydroelectric station including an integral hydromotive assembly having buoyancy means therein operable to overcome the entire mass of the hydromotive assembly and including means therein for horizontally displacing said assembly away from and toward the dam body.

With these and other objects in view which will more readily appear as the nature of the invention is better understood, the invention consists of the novel construction, combination and arrangement of parts hereinafter more fully described, illustrated and claimed.

A preferred and practical embodiment of the invention is shown in the accompanying drawings in which.

Similar reference characters designate corresponding parts throughout the several figures of the drawings.

Figure 1:
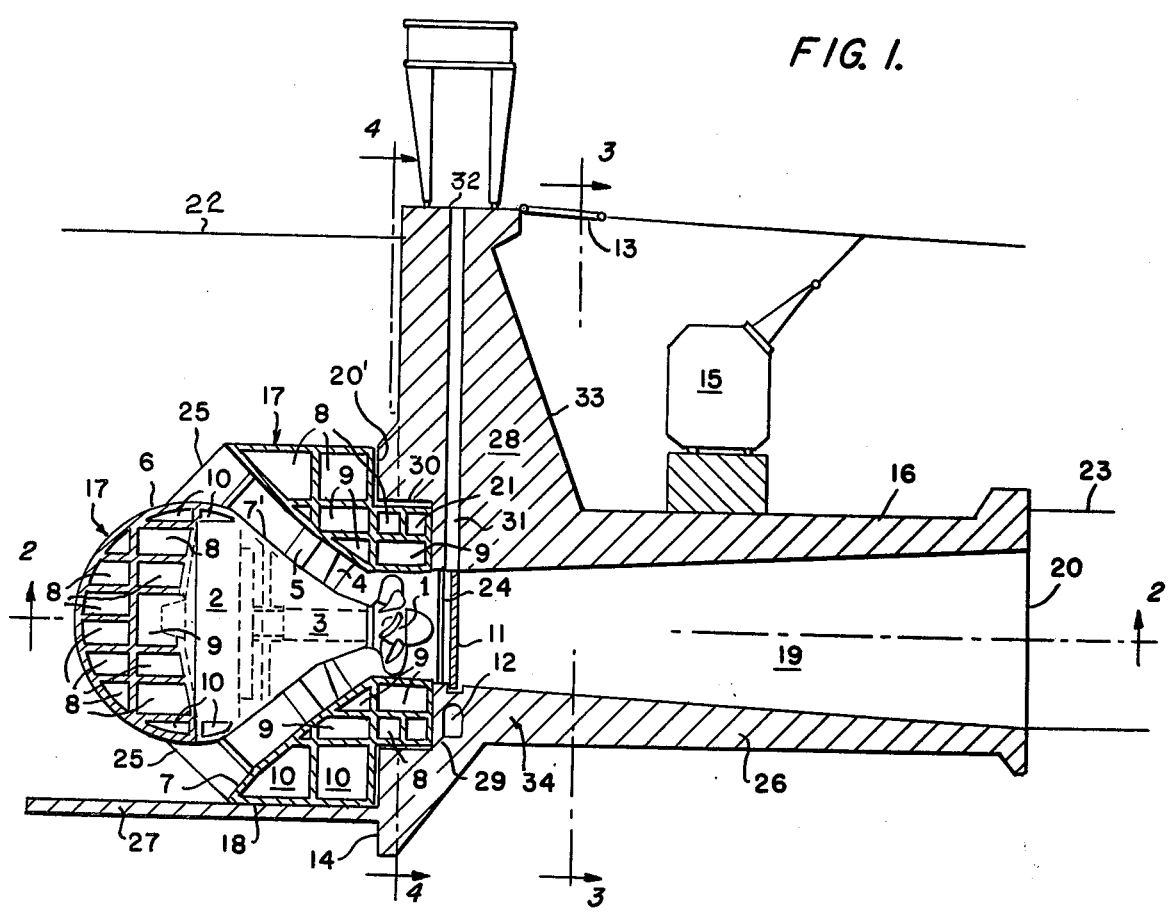
FIG. 1 is a vertical sectional view of a dam having a suspended hydroelectric station according to the present invention.
Figure 2:
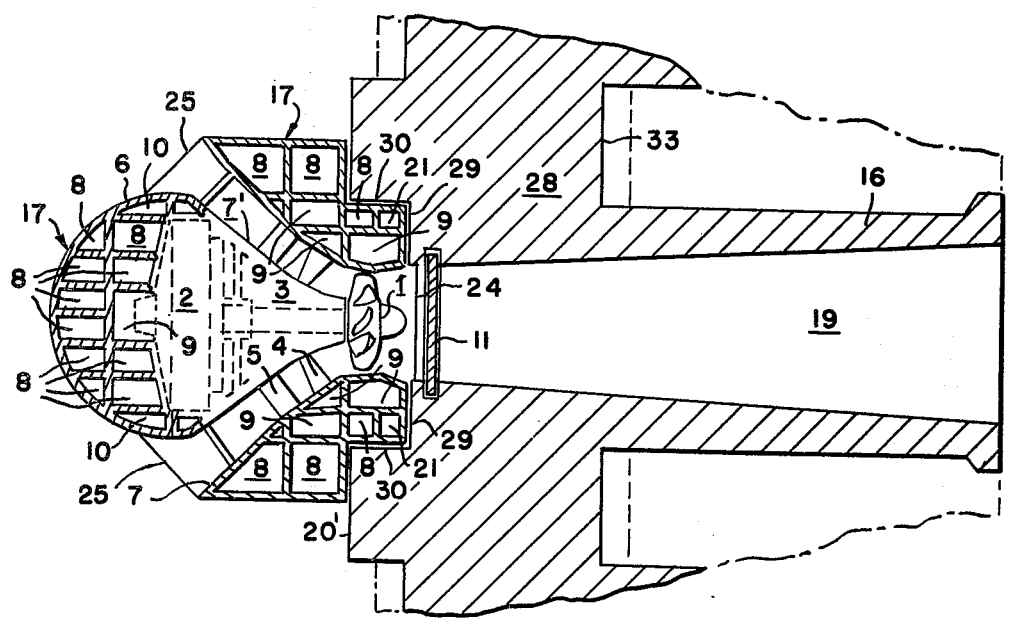
FIG. 2 is a horizontal sectional view taken along the line 2—2 of FIG. 1.

Referring now to the drawings, particularly FIGS. 1 and 2, the present invention will be seen to comprise a hydromotive assembly, generally designated 17, containing therein an electric transformation or generation set including the forwardmost motive turbine runner 1 joined to a generator 2 by means of the connecting shaft 3. The generator 2 may have a similar diameter in relation to the turbine runner bulb-type or, as illustrated, may comprise a substantially larger diameter resulting in the suspended type electric generation set. A gated distributor 4 having movable vanes is disposed rearwardly of the turbine runner 1 following which is a fixed distributor 5, said movable distributor providing a control of the water flow which produces actuation of the turbine runner 1. The generation set is enclosed by means of the capsule 6 and within this capsule 6 are a plurality of chambers 8, 9 and 10 serving as means providing buoyancy to the electric generation set.

The aforedescribed generation set 6 includes an exterior peripheral wall 7' which is spaced inwardly from the peripheral wall 7 to provide a conduit serving as the water flow circulating path conically and angularly surrounding the capsule 6 and extending from one end of the hydromotive assembly to the other. The configuration of the foregoing structure will be seen to provide a fluid conduit defining a significantly restricted fluid flow path from the upstream open end to the downstream turbine runner conduit's cross area of the hydromotive assembly 17.

The main body of the hydromotive assembly 17 will be seen likewise to include a plurality of chambers 8, 9 and 10. Chambers 8 preferably serve as buoyancy compartments, chambers 9 as machine halls and the remaining chambers 10 for ballasting purposes or for fluid storage. The volume of the various chambers will be adequate to at least provide a lifting force of a magnitude sufficient to overcome the full weight of the hydromotive assembly.

The hydromotive assembly 17 is adapted to be positioned as an integral unit with one end of its water conduit juxtaposed appropriate dam water directing means comprising a passage through the dam body 28. A suitable gate 11, vertically displaceable within slots 31 formed in the dam body 28 may be lowered as shown in FIGS. 1 and 2 in order to close off the dam water directing means for purposes of servicing the installation or in case of an emergency such as a runaway generation set.

Entry within the dam main body 28 may be achieved through access means 12 therein while switchyard electrical components and the usual transformers are shown at 13 and 15 respectively, below the downstream face 33 of the dam body. A diffuser 16 extends downstream from the dam water passage and includes an interior defining a hollow conduit 19. As shown in FIGS. 1 and 2 of the drawings, the diffuser 16 is preferably embodied as an integral part of the dam main body 28 and is supported upon the downstream slab 26 which extends from the bottom 34 of the dam main body to the downstream open end 20 of the diffuser.

Referring now to the upstream construction of the present invention, the bottom 18 of the hydromotive assembly 17 will be seen to be juxtaposed the upstream slab 27 joined to the toe of 14 of the dam. Rollers (not shown) may be provided on the bottom 18 to ease horizontal displacement of the hydromotive assembly atop the slab 27. In view of the normally suspended condition of the hydromotive assemblies 17, it will be appreciated that the mass of the upstream slab 27 as well as much of the remaining structure of the dam itself is considerably less than that as required in present hydroelectric stations. When the hydromotive assembly is in operation, the normal hydraulic thrust thereof is supported by the upstream face 20' of the dam main body while the forward portion of the assembly nests within the recess therein defined by the rearwardly directed surfaces 29 and laterally directed surfaces 30. Means for achieving horizontal or axial displacement of the hydromotive assembly is provided in the form of recesses 21 disposed in the forward portion of the assembly 17 for the reception of hydraulic jacks or other force multiplying means.

When disposed within the use position as shown in the drawings, the hydromotive assembly 17 will be seen to be positioned with its downstream open end 24 fully disposed within the recess defined by the surfaces 29 and 30 and with its upstream open end 25 directed in the opposite direction. By manipulation of the buoyancy means provided by chambers 8 the assembly will be understood to be maintained in a suspended condition below the upstream water level 22 and the air or fluid controlling the various chambers will be understood to be regulated to maintain this suspended condition regardless of the position of the upstream water level 22 or downstream water level 23. Manipulation of the service gate 11 may be readily achieved by means of suitable crane apparatus 35 disposed atop the dam main body as at 32.

Figure 3:
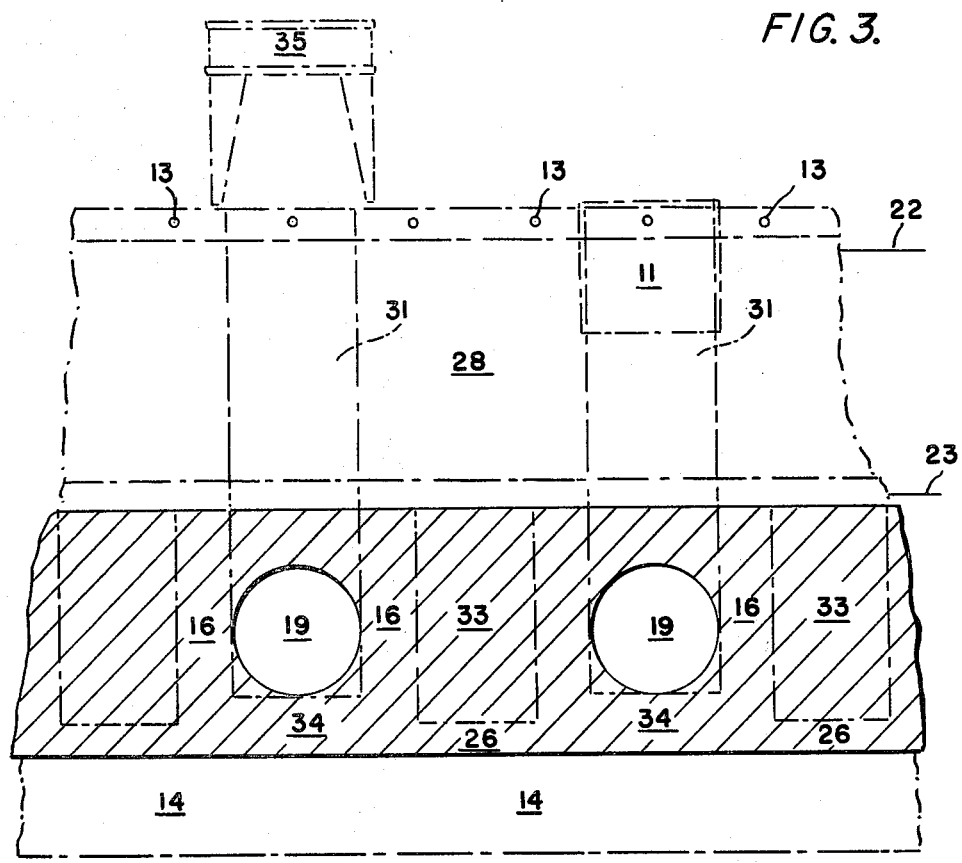
FIG. 3 is a transverse vertical sectional view taken along the line 3—3 of FIG. 1
Figure 4:
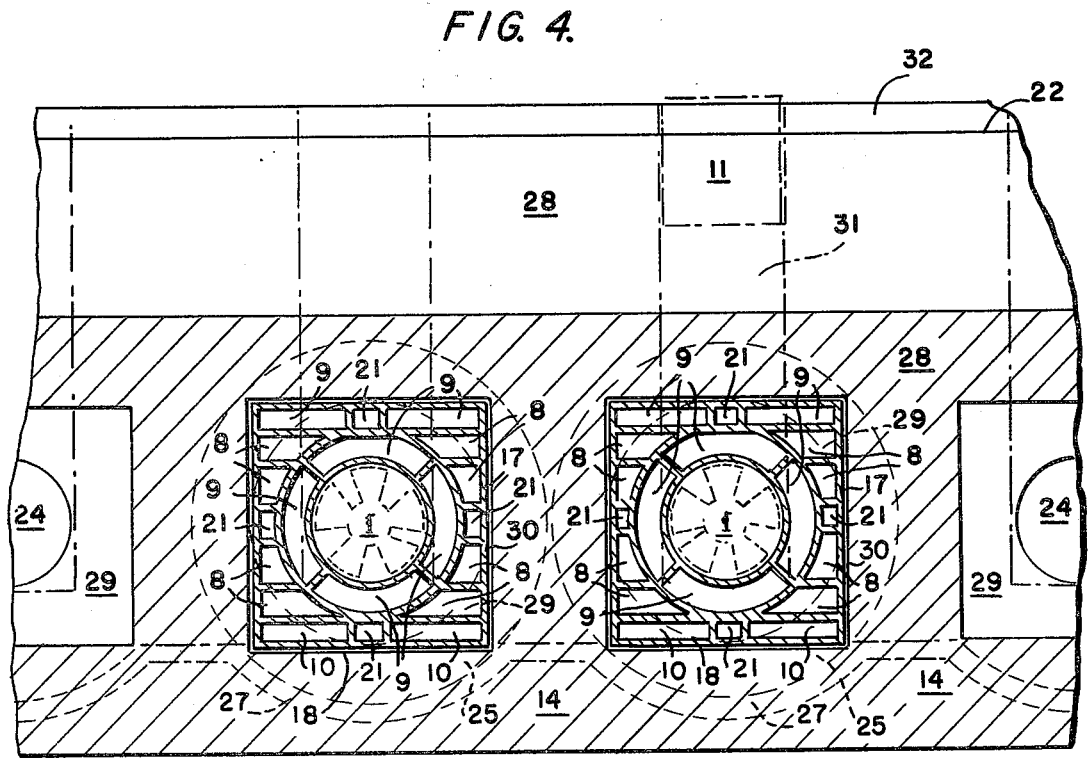
FIG. 4 is a sectional view taken along the line 4—4 of FIG. 1.

The structure illustrated in FIGS. 1 and 2 of the drawings depicts a single hydromotive assembly and its associated portion of the dam body structure and this illustrated structure will be understood to be multiplied any number of times according to the size and requirements of the particular hydroelectric installation, with a plurality of the hydromotive assemblies 17 being adjacently disposed such as shown in FIGS. 3–4 of the drawings.

I claim:

1. In a water storing dam including a main body having fluid conveying means therethrough, the improvement comprising, one or more hydromotive assemblies positioned adjacent said main dam body, each said hydromotive assembly including a main body provided with a capsule contained therein, an energy generation unit within said hydromotive assembly capsule, peripheral walls on said hydromotive assembly main body and contained capsule defining a fluid flow conduit substantially extending through the axial extent of said hydromotive assembly, said conduit extending between first and second open ends at opposite ends of said hydromotive assembly, one said open end juxtaposed said dam fluid conveying means, buoyancy means within said hydromotive assembly capsule, said buoyancy means operable to exert a lifting force upon said hydromotive assembly when said one open end thereof is juxtaposed said dam fluid conveying means.

2. A water storing dam according to claim 1 wherein, said buoyancy means is operable to exert a lifting force of a magnitude substantially equal to the full weight of said hydromotive assembly.

3. A water storing dam according to claim 1 wherein, said energy generation unit includes a generator mechanically connected to a turbine.

4. A water storing dam according to claim 1 including, means on said hydromotive assembly permitting axial displacement thereof in an upstream/downstream direction.

5. A water storing dam according to claim 1 wherein, said hydromotive assembly fluid flow conduit defines a substantially restricted path from one said open end serving as an intake to the other said open end juxtaposed said dam fluid conveying means.

6. A water storing dam according to claim 1 wherein, said buoyancy means includes a plurality of hermetic chambers of a volume sufficient to provide sinking or floatation of said hydromotive assembly when said chambers are filled with liquid or gas, respectively.

7. A water storing dam according to claim 1 including, means external said hydromotive assembly operable to control fluid flow through said dam fluid conveying means and means on said hydromotive assembly permitting substantial horizontal displacement thereof upon actuation of said fluid flow control means.

8. A water storing dam according to claim 1 including, a diffuser axially joined to said fluid conveying means and said diffuser integrally combined with said dam main body.

* * * * *